United States Patent [19]

Walker

[11] 4,095,679
[45] Jun. 20, 1978

[54] STOP MEANS FOR SELF-PROPELLED SPRINKLER

[76] Inventor: Robert W. Walker, 4381 County Rd. U, Wiggins, Colo. 80654

[21] Appl. No.: 744,349
[22] Filed: Nov. 23, 1976
[51] Int. Cl.² .................................................. B60T 3/00
[52] U.S. Cl. ........................................ 188/32; 188/2 R
[58] Field of Search ................ 188/2 R, 32; 239/273, 239/288.3; 187/8.52, 8.59, 8.67

[56] References Cited

U.S. PATENT DOCUMENTS

| | | | |
|---|---|---|---|
| 1,943,003 | 1/1934 | Cochin | 187/8.52 |
| 2,414,383 | 1/1947 | Merriam | 188/32 UX |
| 3,119,466 | 1/1964 | Gilson | 188/32 |
| 3,605,954 | 9/1971 | Wakabayashi et al. | 188/32 X |
| 3,934,683 | 1/1976 | Walker | 188/32 |

Primary Examiner—Duane A. Reger
Attorney, Agent, or Firm—Bacon & Thomas

[57] ABSTRACT

An elongated frame rests on the ground in the path of a self-propelled sprinkler wheel. The wheel rides up onto a pair of rollers on the frame to prevent the wheel from obtaining traction and another roller on the frame engages the front of the wheel to positively block further forward movement of the sprinkler.

6 Claims, 4 Drawing Figures

STOP MEANS FOR SELF-PROPELLED SPRINKLER

BACKGROUND OF THE INVENTION

This invention is in the field of devices for stopping self-propelled vehicles.

Self-propelled sprinklers are currently being used in many farming operations. Such sprinklers usually comprise a pair of widely spaced carriages supporting a sprinkling system extending therebetween and connected to a source of water by means of a long flexible hose or the like. It is customary to cause the water flowing to the sprinkler to pass through a motor arranged to rotate one or more carriage wheels to cause the sprinkler to progress over the ground. Such self-propelled sprinklers normally operate without controls and, therefore, move more or less at random around an area limited by the length of the water supply hose. One problem that has arisen is that, sometimes as a result of structure or other environmental features in the area, the sprinklers have a tendency to either damage adjacent installations or to damage themselves when they collide with or run over such environmental features.

Devices have been proposed heretofore for placement in the path of travel of a self-propelled vehicle to constitute a barrier by denying the vehicle traction with the earth. Such a device is shown in the patent to Mitcham U.S. Pat. No. 2,308,706 which proposes to provide rollers upon which a military tank would climb and the rollers thereon would deny the tank traction and thus halt its progress. Such devices as proposed by that patent, however, would not be satisfactory for use in limiting the travel of a self-propelled sprinkler.

The present invention relates to a readily portable and selectively positionable device for engaging and restraining self-propelled sprinklers in agricultural or the like environments.

In general, the device comprises a portable frame having freely rotatable rollers thereon and which when placed in the path of travel of a sprinkler will cause the traction wheel or wheels of the sprinkler to ride up onto the rollers and thus lose all traction with the earth. Further rollers engage the front of the leading wheels of the sprinkler to ensure restraint against forward travel.

DESCRIPTION OF A PREFERRED EMBODIMENT

Figure 1:
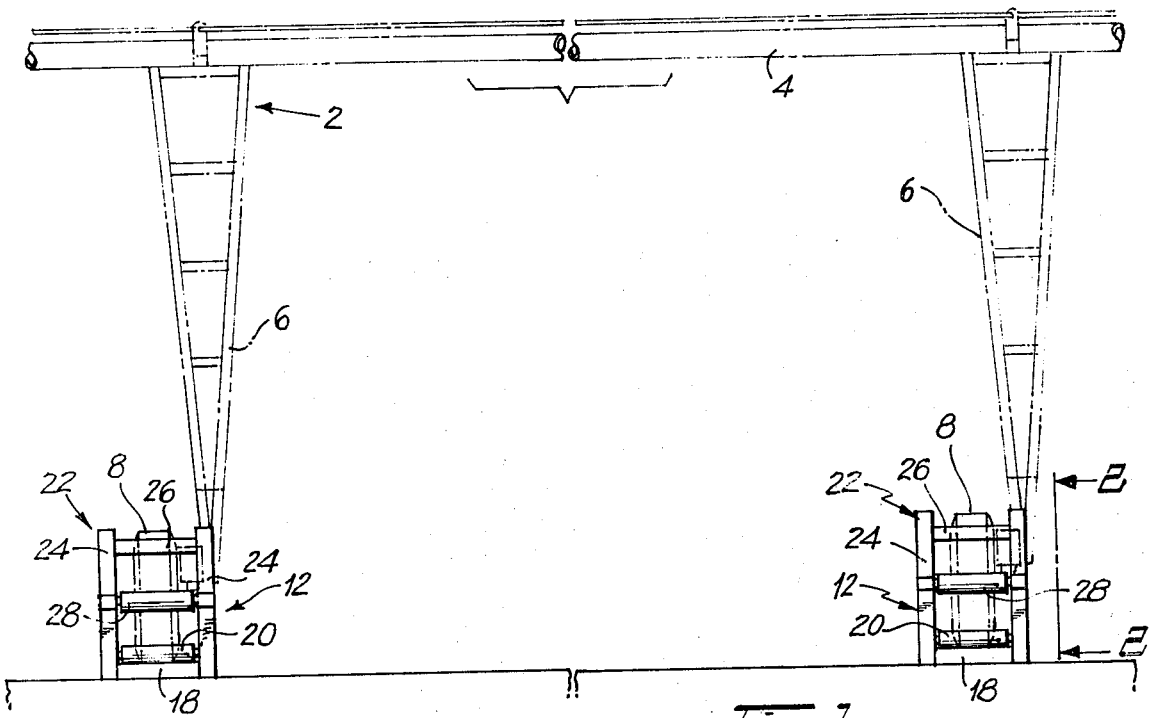
FIG. 1 is a view of the apparatus of the present invention showing portions of a self-propelled sprinkler in broken line.
Figure 2:
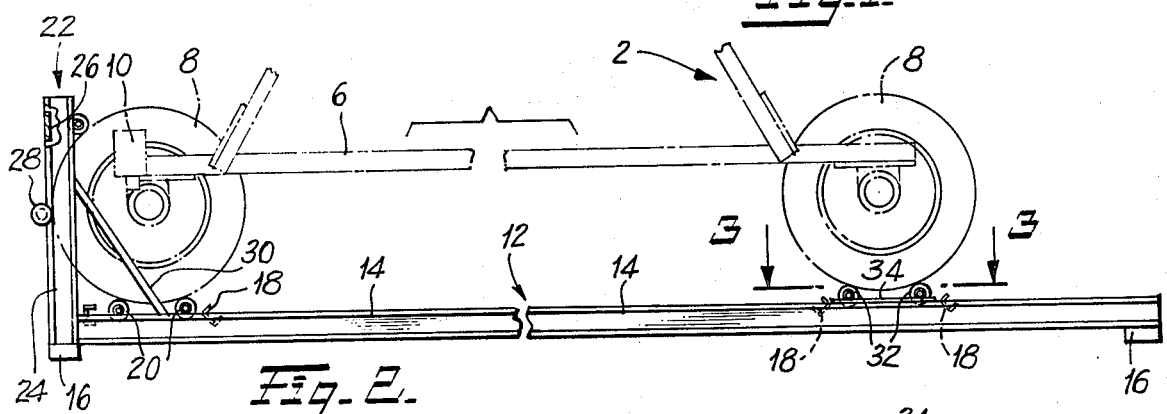
FIG. 2 is an enlarged fragmentary side view as seen along the line 2—2 of FIG. 1.
Figure 3:
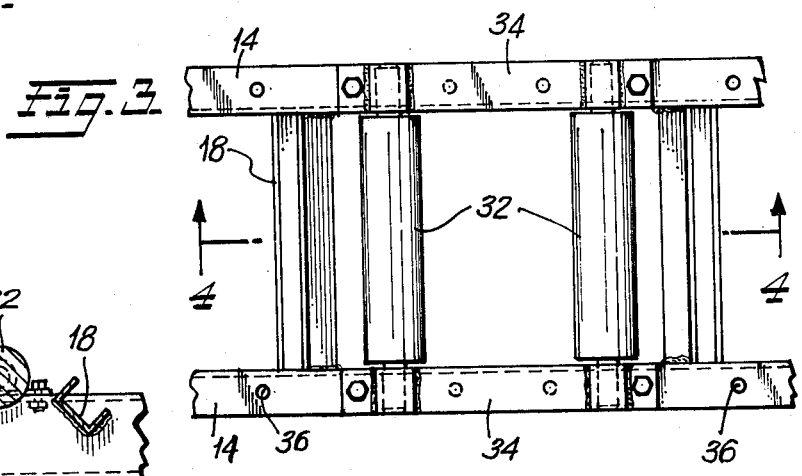
FIG. 3 is a further enlarged top plan view of a portion of the apparatus as seen along the line 3—3 of FIG. 2.
Figure 4:
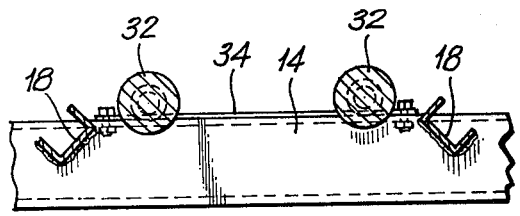
FIG. 4 is a longitudinal sectional view taken along the line 4—4 of FIG. 3.

FIG. 1 schematically represents the present invention and illustrates its operation with relation to a self-propelled sprinkler apparatus shown in broken line and indicated generally by numeral 2. The sprinkler apparatus generally comprises an overhead conduit 4 having nozzles or the like along its length for spraying irrigation water on the ground below the conduit being supported by suitable frames 6 having ground wheels 8 thereon. As best shown in FIG. 2, at least one of the ground wheels 8 of each frame 6, that shown as a forward wheel in FIG. 2, is provided with a driving motor 10 operated by the pressure of water being conducted to the overhead conduit 4. In some instances, both the front and rear wheels 8 of each frame may be driven by such motors and, in other cases, either the forward or the rear wheel 8 only may be so driven. Self-propelled sprinklers of this type are well known and need not be further described.

The present invention comprises one or more devices 12 for arresting forward movement of the described sprinklers, wherein the devices are separate from the sprinklers. Each device 12 comprises a pair of elongated frame members 14 which may be in the form of metal channels or the like, held in spaced relation by suitable cross members 16 and 18. Adjacent the forward end of the device 12 a pair of freely rotatable rollers 20 is mounted on the beams 14 to extend transversely thereacross. Also at the forward end of the horizontal frame just described there is a vertical frame 22 rigidly fixed to the horizontal framework and comprising a pair of upstanding members 24 secured to the beams 14 and held in fixed spaced relation by a suitable cross member 26. Intermediate the top and bottom of the vertical frame member 22 is a further transverse roller 28 journalled for free rotation thereon. The vertical frame member 22 is further held in rigid braced relationship to the horizontal frame portion by a pair of diagonal braces 30 on opposite sides thereof. The transverse frame members 18 are in the form of upwardly open channels arranged at an oblique angle as shown in the drawings to constitute ramps to direct the sprinkler wheels 8 upwardly from the ground over the rollers 20.

Two such devices 12 are shown in FIG. 1, being positioned to intercept the driving wheels of each frame member 6 of the self-propelled sprinkler shown.

It will be obvious that the stop devices described are readily portable and may be positioned in the path of movement of the self-propelled sprinklers in position to arrest those sprinklers before they reach any installation or feature that might be damaged thereby or which might cause damage to the sprinkler. Assuming that the sprinkler carriage 6 shown in FIG. 2 has not yet reached the device 12 but which is positioned in its path of movement, the sprinkler will be driven by motor 10 in a forward direction, that is, toward the left, as seen in FIG. 2. The wheel 8 may progress between the beams 14 until it reaches the transverse frame member 18 and its tractive forces against that ramp member will cause that wheel to rise and ride upwardly onto the rollers 20 as shown in FIG. 2 mating with the stop. In this position the forward wheel 8 also impinges against transverse roller 28 which serves as a positive stop against further forward movement and the rollers 20 and 28 permit the wheel 8 to continue to rotate under the influence of motor 10 without forward progress. It is to be further noted that the diagonal braces 30 will be on opposite sides of the wheel 8 and thus prevent undue lateral movement of the wheel relative to the stop device 12.

In some instances, either both of the wheels 8 will be driven or only the rear wheel 8 will be driven by a fluid motor. Whenever a rear wheel is driven, it is essential that the stop device have a further pair of rollers 32 positioned to engage and support the rear wheel when the forward wheel is in the position shown in FIG. 2. With a driven rear wheel supported on the rollers 32 traction is denied to the apparatus and it is restrained against further forward movement. In the event of use in a sprinkler where only a forward wheel is power driven, the rollers 32 will be omitted. Otherwise, when the forward wheel goes over the rollers 32 to a position supported thereby, the apparatus will no longer have forward traction and the forward wheel cannot then reach the roller 28 at the forward end of the apparatus. Thus, the rollers 32 are shown as being journalled on removable frame members 34. Furthermore, the beams 14 may be provided with a series of openings 36 whereby the pair of rollers 32 may be adjusted forwardly or rearwardly to accommodate self-propelled sprinklers of different wheel base. In the event such adjustment forwardly or rearwardly is resorted to, additional transverse ramp members 18 must be provided to define ramps for the sprinkler wheels at each position of adjustment of the rollers 32.

While the foregoing description refers to only a single specific embodiment of the invention, it is to be understood that other forms may be resorted to within the scope of the appended claims.

I claim:

1. Stop means for interrupting the motion of self-propelled sprinkler means having power driven ground wheels, wherein the stop means is portable and is separate from the sprinkler means, and when in use, is positioned on the ground in front of the sprinkler means, in the path of movement of the sprinkler means, whereby when the sprinkler means mates with the stop means, motion of the sprinkler means ceases even though the ground wheels continue to rotate; said stop means comprising:

a first elongated frame adapted to lie flat on the earth to extend along the path of at least one power driven ground wheel of a sprinkler;

a second frame rigidly fixed to and upstanding from a forward end of said first frame;

at least a first pair of spaced freely rotatable rollers on said first frame, extending transversely thereof adjacent said second frame and arranged to support the power driven ground wheel thereon; and at least one freely rotatable roller on said second frame, generally parallel to the rollers of said pair, and spaced upwardly from said pair of rollers in position to engage the front of the power driven ground wheel resting on said pair of rollers and thereby block forward tractive movement of said wheel.

2. Stop means as defined in claim 1 including a second pair of rollers longitudinally spaced from the first pair of rollers on said first frame and positioned to support a second wheel of a sprinkler spaced longitudinally from said one power driven ground wheel.

3. Stop means as defined in claim 1 wherein said first and second frames each comprise parallel elongated rigid members and transverse brace members therebetween.

4. Stop means as defined in claim 1 including laterally spaced diagonal braces extending between said first and second frames and so positioned that a sprinkler wheel on said pair of rollers extends between said braces and is thereby confined against undue lateral movement relative to said frames.

5. Stop means as defined in claim 2 wherein said second pair of rollers is selectively adjustable longitudinally along said first frame.

6. Stop means as defined in claim 1 including a transverse frame member on said first frame positioned in front and of adjacent to at least the rearmost of said pair of rollers for defining a ramp to direct a sprinkler wheel over said roller.

* * * * *